US006969124B2

(12) United States Patent
Gerard

(10) Patent No.: US 6,969,124 B2
(45) Date of Patent: Nov. 29, 2005

(54) CENTER CAP FOR VEHICLE WHEEL

(75) Inventor: Philip O. Gerard, Ada, MI (US)

(73) Assignee: Lacks Enterprises, Inc., Grand Rapids, MI (US)

(*) Notice: Subject to any disclaimer, the term of this patent is extended or adjusted under 35 U.S.C. 154(b) by 0 days.

(21) Appl. No.: 10/689,228

(22) Filed: Oct. 20, 2003

(65) Prior Publication Data
US 2004/0095013 A1 May 20, 2004

Related U.S. Application Data

(60) Provisional application No. 60/427,678, filed on Nov. 19, 2002.

(51) Int. Cl.[7] .............. B60B 7/04; B60B 7/12; B60B 27/00
(52) U.S. Cl. .............. 301/37.32; 301/37.26; 301/108.1
(58) Field of Search .......... 301/37.101, 37.26–28, 301/37.102, 37.31, 37.32–36, 37.108, 108.1, 301/108.3, 108.2

(56) References Cited

U.S. PATENT DOCUMENTS

| 681,666 A | * | 8/1901 | Call .................. 301/108.1 |
| 2,217,086 A | | 10/1940 | Whitacre |
| 2,819,929 A | | 1/1958 | Hunt |
| 3,998,494 A | | 12/1976 | Spisak |
| 4,123,111 A | | 10/1978 | Renz et al. |
| 4,133,583 A | | 1/1979 | Spisak |
| 4,183,587 A | | 1/1980 | Spisak |
| 4,217,003 A | | 8/1980 | Main |
| 4,270,805 A | * | 6/1981 | Spisak .................. 301/37.35 |
| 4,316,638 A | | 2/1982 | Spisak |
| 4,357,053 A | | 11/1982 | Spisak |
| 4,382,635 A | | 5/1983 | Brown et al. |
| 4,457,559 A | * | 7/1984 | Renz .................. 301/37.36 |
| 4,457,560 A | | 7/1984 | Rowe et al. |
| 4,458,952 A | | 7/1984 | Foster et al. |
| 4,547,021 A | | 10/1985 | Abbate Daga |
| 4,596,425 A | * | 6/1986 | Hung .................. 301/37.34 |
| 4,707,035 A | | 11/1987 | Kondo et al. |
| 4,822,109 A | | 4/1989 | Feria |
| 4,842,339 A | | 6/1989 | Roulinson |
| 4,995,674 A | * | 2/1991 | Shirai et al. .......... 301/37.36 |
| 5,112,112 A | * | 5/1992 | Baba .................. 301/108.3 |
| 5,163,739 A | | 11/1992 | Stanlake |
| 5,297,854 A | | 3/1994 | Nielsen et al. |
| 5,368,370 A | | 11/1994 | Beam |
| 5,443,582 A | * | 8/1995 | Ching .................. 301/37.376 |
| 5,509,725 A | * | 4/1996 | Chiu .................. 301/37.34 |
| 5,564,791 A | | 10/1996 | Chase et al. |

(Continued)

FOREIGN PATENT DOCUMENTS

EP       0087607       9/1983

(Continued)

Primary Examiner—Russell D. Stormer
Assistant Examiner—Jason R. Bellinger
(74) Attorney, Agent, or Firm—Price, Heneveld, Cooper, DeWitt & Litton, LLP.

(57) ABSTRACT

A wheel center cap for a vehicle wheel includes a substantially planar body portion, and a plurality of flexibly resilient fingers extending substantially orthogonal to the body portion and adapted to be received within a central aperture of a wheel. Each finger includes a pair of sidewalls and an integrally formed outer wall, wherein the outer wall includes a centrally-located portion defining a first radius of curvature, and rounded abutment portions located proximate the sidewalls and having a second radius of curvature that is less than the first radius of curvature.

24 Claims, 2 Drawing Sheets

U.S. PATENT DOCUMENTS

| | | | |
|---|---|---|---|
| 5,577,809 A | 11/1996 | Chase | |
| 5,597,213 A | 1/1997 | Chase | |
| 5,630,654 A | 5/1997 | Chase | |
| 5,636,906 A * | 6/1997 | Chase | 301/37.43 |
| 5,707,113 A | 1/1998 | Russell | |
| 5,845,973 A | 12/1998 | Chase | |
| 6,022,081 A | 2/2000 | Hauler et al. | |
| 6,039,406 A | 3/2000 | Sheu | |
| 6,082,829 A | 7/2000 | Chase | |
| 6,152,538 A | 11/2000 | Ferriss et al. | |
| 6,206,479 B1 * | 3/2001 | Jackman et al. | 301/108.1 |
| 6,209,204 B1 | 4/2001 | Eikhoff | |
| 6,238,007 B1 * | 5/2001 | Wieczorek et al. | 301/37.31 |
| 6,402,254 B1 | 6/2002 | Eikhoff et al. | |
| 6,439,670 B1 * | 8/2002 | Winters | 301/37.101 |
| 6,443,531 B1 * | 9/2002 | Hogan et al. | 301/37.42 |
| 6,457,781 B1 | 10/2002 | Cutcher et al. | |
| 6,663,189 B2 * | 12/2003 | Enomoto et al. | 301/37.36 |
| 6,672,676 B2 * | 1/2004 | Zaniboni | 301/37.101 |

FOREIGN PATENT DOCUMENTS

| | | |
|---|---|---|
| GB | 2054483 | 2/1981 |
| JP | 04085102 | 3/1992 |

* cited by examiner

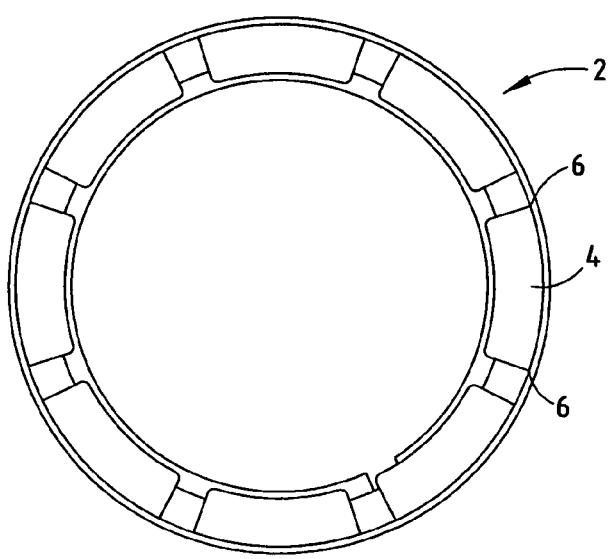
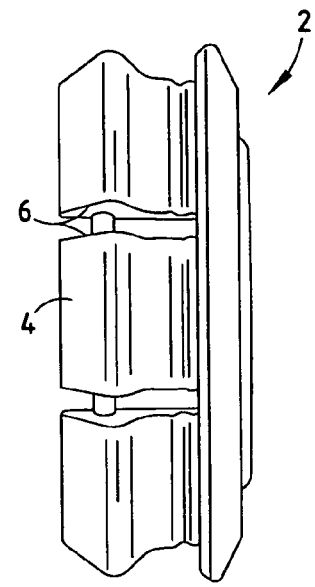
FIG. 1
PRIOR ART
FIG. 2
PRIOR ART
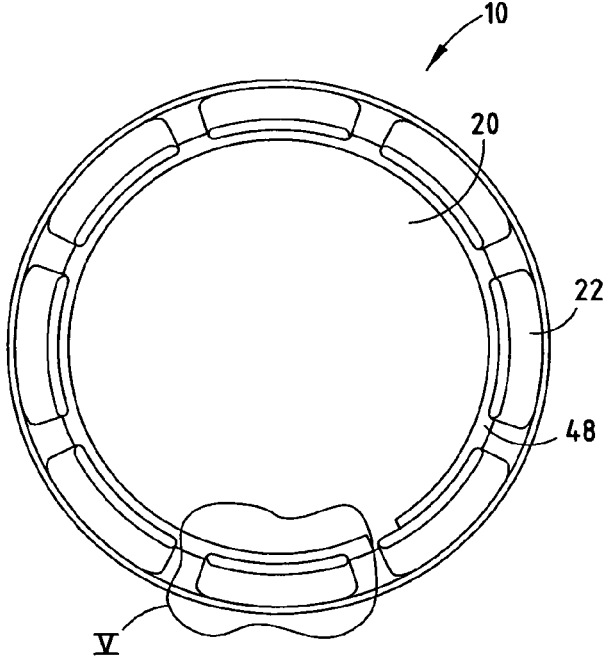
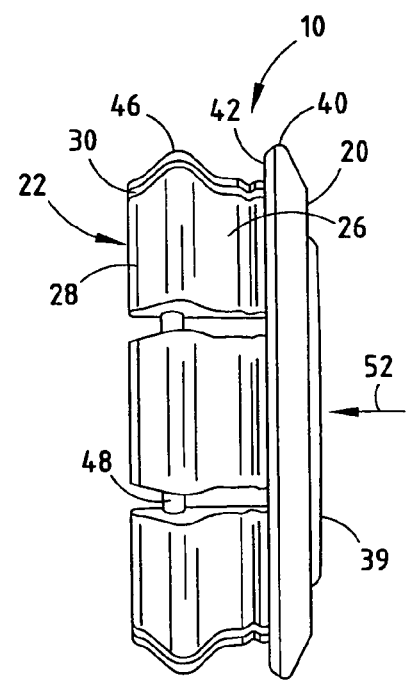
FIG. 3
FIG. 4

US 6,969,124 B2

CENTER CAP FOR VEHICLE WHEEL

CROSS REFERENCE TO RELATED APPLICATION

This application claims the benefit of U.S. Provisional Application No. 60/427,678, filed Nov. 19, 2002, entitled CENTER CAP FOR VEHICLE WHEEL.

BACKGROUND OF THE INVENTION

The present invention relates to a center cap for a vehicle wheel, and in particular to the connection of a decorative wheel center cap to a vehicle wheel assembly.

Ornamental outer coverings have been employed for providing a decorative surface to the exposed surface of wheels for many years. These outer coverings offer design flexibility in that various configurations may be used to cover a single style wheel. One aspect of some of these outer coverings has been the utilization of a center cap to cover the central hub aperture of an associated wheel. These center caps 2, as shown in FIGS. 1 and 2, have been held in connection with the wheel by various means, one of which incorporates a plurality of connecting tabs 4. Typically, the tabs 4 of the shown design include sharp corners 6 that contact the associated wheel during the assembly of the center cap with the wheel. As these components are assembled, the sharp corners 6 of the tabs 4 dig into the surface of the wheel proximate the central hub, thereby increasing the force required to be exerted on the center cap 2 to assemble the cap 2 with the wheel, resulting in degradation to the corrosion barrier finish and a destruction of the aesthetic finish on the wheel. These problems are magnified when the wheel cap is constructed of a material that is significantly harder than the associated wheel, such as when the wheel cap is covered with a chrome finish and the wheel is constructed from aluminum and the like.

A central cap is desired that reduces the force required to assemble the cap with an associated wheel, and that does not adversely effect the protective and aesthetic finish of the wheel during assembly.

SUMMARY OF THE INVENTION

One aspect of the present invention is to provide a wheel having an outer surface and a centrally located aperture extending through the wheel, and a wheel cap having a body portion and a plurality of flexibly resilient fingers extending substantially orthogonal to the body portion, wherein each finger has a pair of side walls and an integrally formed outer wall, and wherein the outer wall includes a centrally located portion and rounded abutment portions located proximate the side walls.

Another aspect of the present invention is to provide a wheel center cap for a vehicle wheel that includes a substantially planar body portion, and a plurality of flexibly resilient fingers extending substantially orthogonal to the body portion and adapted to be received within a central aperture of a wheel. Each finger includes a pair of side walls and an integrally formed outer wall including a centrally located portion defining a first radius of curvature, and rounded abutment portions located proximate the side walls and having a second radius of curvature that is less than the first radius of curvature.

Yet another aspect of the present invention is to provide a method of assembling a wheel cap with a vehicle wheel that includes providing a wheel assembly having an outer surface and a centrally located hub aperture extending through the wheel assembly, wherein the hub aperture has a first radius, and providing a wheel cap having a body portion and a plurality of flexibly resilient fingers extending substantially orthogonal to the body portion, wherein each finger has a pair of side walls and an integrally formed outer wall including a centrally located portion having a second radius and rounded abutment portions located proximate the side walls and each having a third radius, wherein the third radius is less than the second radius. The method also includes aligning the fingers of the wheel cap with the hub aperture with the wheel, and providing an inwardly directed force to the body portion of the wheel cap, thereby forcing the legs to flex inwardly until the rounded abutment portions of the fingers abut the hub aperture of the wheel assembly.

The present inventive center cap for vehicle wheels is efficient in use, economical to manufacture, easily assembled with an associated wheel assembly without the use of tools, results in a decrease in the force required to assemble the center cap with the associated wheel assembly, reduces the adverse effects of assembling the center cap with the associated wheel and is particularly well adapted for the proposed use.

These and other advantages of the invention will be further understood and appreciated by those skilled in the art by reference to the following written specification, claims and appended drawings.

BRIEF DESCRIPTION OF THE DRAWINGS

FIG. 1 is a rear elevational view of a prior art wheel center cap;

FIG. 2 is a side elevational view of the prior art wheel center cap;

FIG. 3 is a rear elevational view of a wheel center cap embodying the present invention;

FIG. 4 is a side elevational view of the wheel center cap embodying the present invention;

DETAILED DESCRIPTION OF THE PREFERRED EMBODIMENTS

For purposes of description herein, the terms "upper," "lower," "right," "left," "rear," "front," "vertical," "horizontal," and derivatives thereof shall relate to the invention as oriented in FIGS. 3 and 4. However, it is to be understood that the invention may assume various alternative orientations and step sequences, except where expressly specified to the contrary. It is also to be understood that the specific devices and processes illustrated in the attached drawings, and described in the following specification are exemplary embodiments of the inventive concepts defined in the appended claims. Hence, specific dimensions and other physical characteristics relating to the embodiments disclosed herein are not to be considered as limiting, unless the claims expressly state otherwise.

Figure 5:
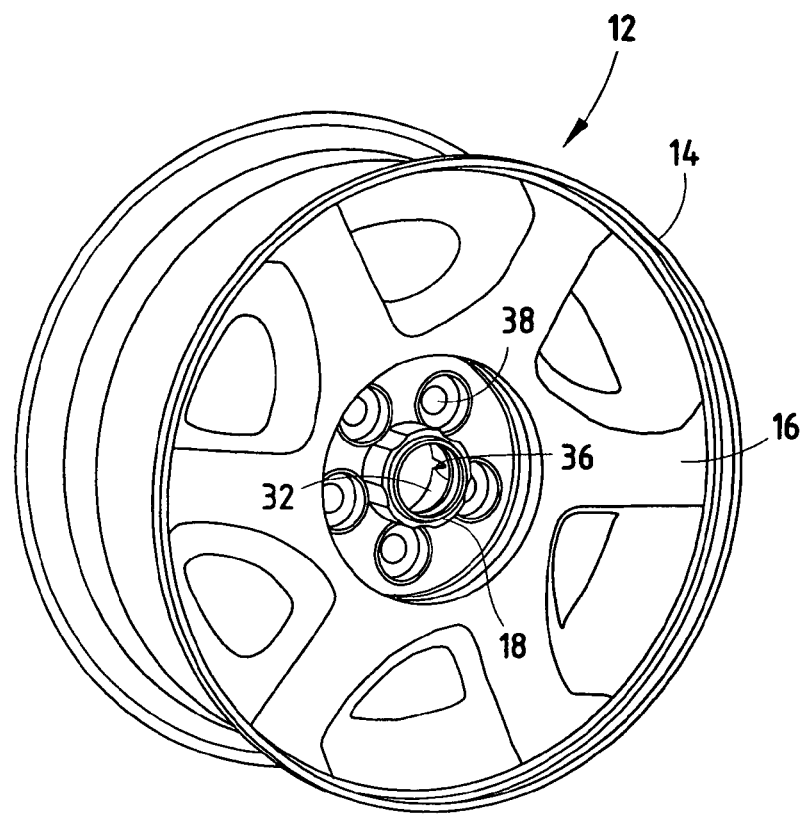
FIG. 5 is a perspective view of a vehicle wheel assembly.
Figure 6:
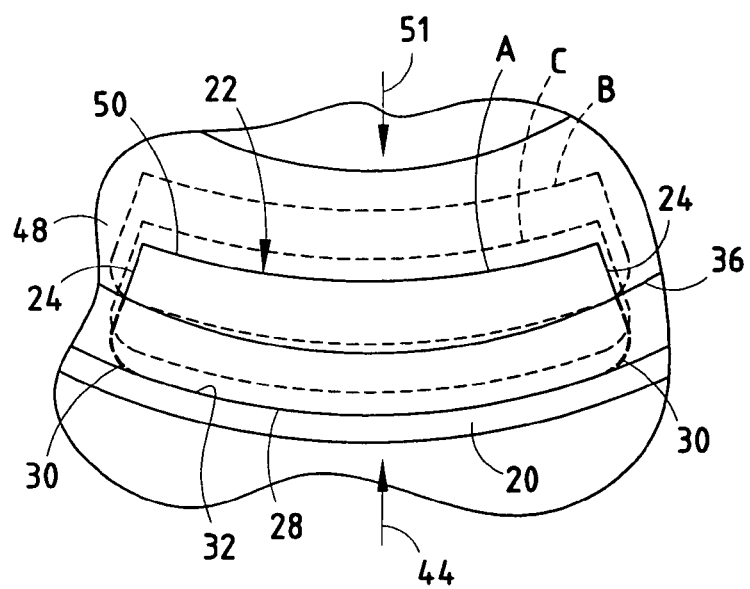
FIG. 6 is an enlarged rear elevational view of a finger of the wheel center cap.

The reference numeral 10 (FIGS. 3 and 4) generally designates a wheel center cap embodying the present invention. In the illustrated example, the center cap 10 is connectable to a vehicle wheel assembly 12 (FIG. 2). As illustrated, the wheel assembly 12 includes a wheel 14, however, the wheel assembly 12 may also include a decorative wheel cladding (not shown) such as those disclosed in U.S. Pat. Nos. 5,564,791; 5,577,809; 5,597,213; 5,630,654; 5,636,906; 5,845,973; and 6,085,829, the disclosures of which are incorporated herein by reference. The wheel 14 has an outer surface 16 and a centrally located hub aperture 18 extending through the wheel 14. The center cap 10 includes a body portion 20 and a plurality of flexibly resilient fingers 22 extending substantially orthogonal to the body portion 20. Each finger 22 (FIG. 6) has a pair of side walls 24 and an integrally formed outer wall 26 having a centrally located portion 28 and rounded abutment portions 30 located proximate the side walls 24.

The wheel 14 of wheel assembly 12 is made of aluminum, magnesium, steel, or other material conventionally used for manufacturing vehicle wheels. The cladding (not shown) may be bonded to the wheel 14 via an adhesive. The cladding is injection molded of a polymeric material, such as a combination of polycarbonate and ABS. The polcarbonate to ABS ratio ranges from about 60% to about 70% polycarbonate and about 40% to about 30% ABS, respectively. Other polymeric materials or composite polymeric materials may be also used. An outer decorative surface of the cladding is covered with a bright (highly reflective) or satin finished metal plating such as chrome as described in U.S. patent application Ser. No. 09/707,866, filed Nov. 7, 2000 and entitled METHOD AND COMPOSITION FOR METALLIC FINISHES, now U.S. Pat. No. 6,749,946, the disclosure of which is incorporated herein by reference. The outer surface 16 of wheel 14 and the outer surface of the cladding can also be painted, textured or otherwise finished for a particularly desired appearance. The hub aperture 18 of the wheel 14 defines an interior or aperture wall 32. A locking ring 36 extends circumferentially about the hub aperture 18 and inwardly from the aperture wall 32.

The wheel assembly 12 also includes a plurality of exposed lug nut apertures 38 arranged in a circular pattern and spaced for the particular vehicle on which the wheel assembly 12 is to be employed. The lug nuts (not shown) as associated with the wheel assembly 12 are typically exposed once the wheel 14 is mounted to a vehicle.

The body portion 20 of the center cap 10 is substantially planar having an outer surface 39, and extends radially outward beyond the fingers 22, thereby creating a rim or lip 40 having an inner surface 42. Each finger is resiliently inwardly flexible in a direction as indicated by directional arrow 44, between an unflexed position A, a flexed assembly position B, and a flexed assembled position C, as discussed below. Each finger 22 includes a raised nub 46 located along the length thereof, and that is adapted to abut the locking ring 36 of the wheel 14 as described below. The center cap 10 is preferably constructed of similar materials and with similar methods as the cladding as discussed above, including the bright (highly reflective) or satin finish metal plating such as chrome. The center cap 10 further includes a flexibly resilient biasing ring 48 located on the middle of and abutting an inner surface 50 of each of the fingers 22, and biasing the fingers 22 outwardly in direction as indicated and represented by arrow 51.

In assembly, the cap 10 is placed within the hub aperture 18 of the wheel 14 by aligning the fingers 22 of the cap 10 with the hub aperture 18 and exerting a force to the outer surface 39 of the cap in a direction as indicated and represented by directional arrow 52. As the fingers 22 are forced within the hub aperture 18, a force is exerted on each finger 22 by the aperture wall 32, thereby forcing the fingers to flex in an inward direction 44 until the nub 46 of each finger 22 is aligned with the locking ring 36 of the wheel 14, and the fingers 22 are each located in the assembly position B. At this position the rounded abutment portions 30 of each finger 22 is in contact with the locking ring 36. The force 52 is continued until the nub 46 of each finger 22 is located behind the locking ring 36 of the wheel 14, and the fingers 22 are each located in the assembled position C. It should be noted that the fingers 22 are inwardly flexed when in the assembled position C and, therefore, continue to exert a force against the aperture wall 32 of the hub aperture 18.

The present inventive center cap for vehicle wheels is efficient in use, economical to manufacture, easily assembled with an associated wheel assembly without the use of tools, results in a decrease in the force required to assemble the center cap with the associated wheel assembly, reduces the adverse effects of assembling the center cap with the associated wheel and is particularly well adapted for the proposed use.

In the foregoing description, it will be readily appreciated by those skilled in the art that modifications may be made to the invention without departing from the concepts disclosed herein. Such modifications are to be considered as included in the following claims, unless these claims by their language expressly state otherwise.

The invention claimed is:

1. A composite wheel, comprising:
   a wheel having an outer surface and a centrally located hub aperture extending through the wheel; and
   a wheel cap having a body portion and a plurality of flexibly resilient fingers extending substantially orthogonal to the body portion, each finger having a pair of side walls and an integrally formed outer wall, the outer wall including a centrally located portion and rounded abutment portions located proximate the side walls and laterally from the centrally-located portion, wherein the fingers abut the hub aperture when the wheel cap is assembled with the wheel, and wherein the centrally located portion of each finger includes a first radius of curvature, and wherein the abutment portion of each finger includes a second radius of curvature different than the first radius of curvature.

2. The composite wheel of claim 1, wherein the second radius of curvature is less than the first radius of curvature.

3. The composite wheel of claim 2, wherein the hub aperture of the wheel includes an interior wall and an annular locking ring extending inwardly from the interior wall, each finger includes a locking nub located along a length thereof, and wherein each finger is flexible between an assembly position, wherein the locking nub of each finger is aligned with the annular locking ring, and an assembled position, wherein the locking nub of each finger is positioned behind the locking ring.

4. The composite wheel of claim 3, wherein the second radius of curvature of each finger is substantially similar to an inner radius of the annular locking ring when the fingers are in the assembly position.

5. The composite wheel of claim 4, wherein the fingers are flexed inwardly when in the assembled position.

6. The composite wheel of claim 5, wherein the body portion of the wheel cap is substantially planar.

7. The composite wheel of claim 6, wherein the body portion of the wheel cap includes a circumferentially extending rim adjustable with the outer surface of the wheel when the fingers are in the assembled position.

8. The composite wheel of claim 7, further including:
   a flexibly resilient ring abutting an interior surface of each of the fingers and biasing the fingers radially outwardly.

9. The composite wheel of claim 1, further including:
a flexibly resilient ring abutting an interior surface of each of the fingers and biasing the fingers radially outwardly.

10. The composite wheel of claim 1, wherein the hub aperture of the wheel includes an interior wall and an annular locking ring extending inwardly from the interior wall, each finger includes a locking nub located along a length thereof, and wherein each finger is flexible between an assembly position, wherein the locking nub of each finger is aligned with the annular locking ring, and an assembled position, wherein the locking nub of each finger is positioned behind the locking ring.

11. The composite wheel of claim 10, wherein the centrally located portion of each finger includes a first radius of curvature, the abutment portion of each finger includes a second radius of curvature different than the first radius of curvature, and wherein the second radius of curvature of each finger is substantially similar to an inner radius of the annular locking ring when the fingers are in the assembly position.

12. The composite wheel of claim 1, wherein the fingers are flexed inwardly when in the assembled condition.

13. The composite wheel of claim 1, wherein the body portion of the wheel cap includes a circumferentially extending rim that abuts the outer surface of the wheel when the fingers are in the assembled position.

14. A wheel center cap for a vehicle wheel, comprising:
a substantially planar body portion; and
a plurality of flexibly resilient fingers extending substantially orthogonal to the body portion and adapted to be received within a hub aperture of a wheel, each finger having a pair of side walls and an integrally formed outer wall, the outer wall including a centrally located portion defining a first radius of curvature, and rounded abutment portions located proximate the side walls and laterally from the centrally located portion and having a second radius of curvature that is less than the first radius of curvature.

15. The wheel center cap of claim 14, wherein each finger includes a locking nub located along a length thereof, and wherein each finger is flexible between an assembly position and an assembled position.

16. The wheel center cap of claim 15, wherein the second radius of curvature of each finger is adapted to be substantially similar to an inner radius of a raised locking ring within the hub aperture of the wheel when the fingers are in the assembly position.

17. The wheel center cap of claim 16, wherein the fingers are flexed inwardly when in the assembled condition.

18. The wheel center cap of claim 17, wherein the body portion includes a circumferentially extending rim that is adapted to abut the outer surface of the wheel when the fingers are in the assembled position.

19. The wheel center cap of claim 14, wherein the first radius of curvature of each finger is adapted to be substantially similar to an inner radius of a raised locking ring within the central aperture of the wheel when the fingers are in an assembly position.

20. The wheel center cap of claim 14, wherein the fingers are flexed inwardly when in an assembled condition.

21. A method of assembling a wheel cap within a vehicle wheel, comprising:
providing a wheel having an outer surface and a centrally located hub aperture extending through the wheel, the hub aperture having a first radius;
providing a wheel cap having a body portion and a plurality of flexibly resilient fingers extending substantially orthogonal to the body portion, each finger having a pair of side walls and an integrally formed outer wall, the outer wall including a centrally located portion having a second radius and rounded abutment portions located proximate the side walls and laterally from the centrally-located portion and each having a third radius, wherein the third radius is less than the second radius;
aligning the fingers of the wheel cap with the hub aperture of the wheel; and
providing an inwardly directed force to the body portion of the wheel cap, thereby forcing the legs to flex inwardly until the rounded abutment portions of the fingers abut the hub aperture of the wheel assembly.

22. The method claim 21, wherein the step of providing the wheel includes providing an annular locking ring extending from a surface of the hub aperture, the step of providing the wheel cap includes providing each finger with a nub located along a length thereof, and wherein the step of providing the inwardly directed force includes continuing to apply the inwardly directed force until the nub of each finger is seated behind the annular locking ring.

23. A composite wheel, comprising:
a wheel having an outer surface and a circumferentially extending wall; and
a wheel cap having a body portion and a plurality of flexibly resilient fingers extending substantially orthogonal to the body portion and abutting the circumferentially extending wall of the wheel, each finger having a pair of side walls, an integrally formed outer wall, and rounded abutment portions located laterally from the outer wall and extending between and longitudinally along the side walls and the outer wall, wherein the body portion includes a first radius of curvature, and wherein the abutment portions include a second radius of curvature that is different than the first radius of curvature.

24. A wheel center cap for a vehicle wheel, comprising:
a substantially planar body portion; and
a plurality of flexibly resilient fingers extending substantially orthogonal to the body portion and adapted to abut a circumferentially extending wall of a wheel, each finger having a pair of side walls and an integrally formed outer wall, and rounded abutment portions located laterally from the outer wall and between and extending longitudinally along the side walls and the outer wall, wherein the outer wall includes a first radius of curvature and the abutment portions include a second radius of curvature that is different than the first radius of curvature.

* * * * *